United States Patent
Eguchi

(10) Patent No.: US 8,027,097 B2
(45) Date of Patent: Sep. 27, 2011

(54) REAR ATTACHMENT LENS AND IMAGE-FORMING OPTICAL SYSTEM USING THE SAME

(75) Inventor: Kaoru Eguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/959,124

(22) Filed: Dec. 2, 2010

(65) Prior Publication Data

US 2011/0141573 A1    Jun. 16, 2011

(30) Foreign Application Priority Data

Dec. 11, 2009    (JP) .................. 2009-281427

(51) Int. Cl.
*G02B 15/02*    (2006.01)

(52) U.S. Cl. .................. 359/675; 359/672; 359/740
(58) Field of Classification Search .................. 359/672, 359/675, 740
See application file for complete search history.

(56) References Cited

U.S. PATENT DOCUMENTS

| | | | |
|---|---|---|---|
| 4,653,871 A * | 3/1987 | Hamanishi | 359/675 |
| 6,124,981 A | 9/2000 | Ogawa | |
| 6,288,847 B1 * | 9/2001 | Tsutsumi | 359/675 |
| 7,593,163 B2 * | 9/2009 | Yamada et al. | 359/675 |
| 7,768,714 B2 * | 8/2010 | Sakai | 359/672 |
| 2002/0191303 A1 * | 12/2002 | Yamakawa | 359/675 |
| 2003/0090811 A1 * | 5/2003 | Shijo et al. | 359/675 |
| 2011/0080647 A1 * | 4/2011 | Sugita et al. | 359/675 |

FOREIGN PATENT DOCUMENTS

JP    2004-226648 A    8/2004
* cited by examiner

*Primary Examiner* — Evelyn A. Lester
(74) *Attorney, Agent, or Firm* — Canon U.S.A., Inc. IP Division

(57) ABSTRACT

A rear attachment lens detachably attached to an image side of a main lens system to change a focal length of an entire system so as to become longer than a focal length of the main lens system includes one or more positive lenses GMp. One among the one or more positive lenses GMp is a positive lens P1. The Abbe number, a partial dispersion ratio, and a partial dispersion ratio difference of a material of the one or more positive lenses GMp and of the positive lens P1, and a focal length of the positive lens P1 are correctly defined so that chromatic aberrations are appropriately corrected, when predetermined conditions are satisfied.

9 Claims, 12 Drawing Sheets

REAR ATTACHMENT LENS AND IMAGE-FORMING OPTICAL SYSTEM USING THE SAME

BACKGROUND OF THE INVENTION

1. Field of the Invention

The present invention relates to a rear attachment lens, which is detachably mounted to the image side of an imaging lens (main lens system) used in a digital still camera, a video camera, a camera for broadcasting, etc., and which changes the focal length of an entire system so as to become longer than that of the main lens system.

2. Description of the Related Art

Hitherto, a rear attachment lens that can be detachably mounted to the image side (image plane side) of a main lens system has been proposed. A rear attachment lens is a type of lens extension that can be removably attached to another lens, e.g., a main imaging lens (imaging optical system), and which changes the focal length of an entire system so as to become longer than that of the main lens system. Examples of rear attachment lenses are discussed in U.S. Pat. No. 6,124,981 and Japanese Patent Application Laid-Open No. 2004-226648.

In general, as the magnification of a rear attachment lens increases, the residual aberration of a main lens is enlarged and image quality is reduced. For example, when the magnification increases twice, transverse aberrations such as coma aberration and chromatic aberration of magnification (transverse chromatic aberration) are simply enlarged twice and image quality is reduced. Also, longitudinal aberrations such as spherical aberration, curvature of the field, and axial (longitudinal) chromatic aberration are enlarged by the square of the magnification, i.e., four times. In the case of the rear attachment lens, however, because the F-number of the main lens is also enlarged twice, aberration per unit focal depth is eventually enlarged twice and image quality is reduced. In a telephoto lens employing a rear attachment lens in many cases, particularly, chromatic aberration is enlarged as the focal length increases. Therefore, when the rear attachment lens is mounted, the enlarged chromatic aberration of magnification among various chromatic aberrations becomes a main cause degrading the image quality.

U.S. Pat. No. 6,124,981 and Japanese Patent Application Laid-Open No. 2004-226648 each disclose a rear attachment lens for changing the focal length of the main lens system to the side where the focal length becomes longer, when attachment lens is mounted to the image side of the main lens system. More specifically, U.S. Pat. No. 6,124,981 discloses the rear attachment lens, which is mounted between the main lens system and a camera, and which increases the focal length of the main lens system by about 1.4 to 2.8 times. In the U.S. Pat. No. 6,124,981, the chromatic aberration of magnification is satisfactorily corrected by using a diffractive optical element. Japanese Patent Application Laid-Open No. 2004-226648 discloses the rear attachment lens, which is mounted between the main lens system and a camera, and which increases the focal length of the main lens system by about 1.7 times. In Japanese Patent Application Laid-Open No. 2004-226648, various aberrations are satisfactorily corrected by using a cemented lens made of a lens material having a proper refractive index.

With the relentless progress toward a larger number of pixels and higher image quality, newer image pickup apparatuses (e.g., digital cameras) are strongly demanded to generate high quality images with minimal chromatic aberration even when the rear attachment lens is mounted to a main lens system used in the digital camera.

SUMMARY OF THE INVENTION

The present invention provides a rear attachment lens, which is detachably attached to the image side of a main lens system, and which changes the focal length of an entire system so as to become longer than that of the main lens system. The rear attachment lens includes one or more positive lenses GMp. Assuming that an Abbe number and a partial dispersion ratio difference of a material of the positive lens GMp are respectively $\nu_{d\_P}$ and $\Delta\theta gF_{\_P}$, a focal length of the positive lens GMp is $f_{\_P}$, a focal length of the rear attachment lens is f, and $(\Delta\theta gF_{\_P} \times f)/(f_{\_P} \times \nu_{d\_P})$ is a ratio P, that one among the one or more positive lenses GMp, which has a maximum ratio P, is a positive lens P1, and that an Abbe number, a partial dispersion ratio, and a partial dispersion ratio difference of a material of the positive lens P1 are respectively $\nu_{d\_P1}$, $\theta gF_{\_P1}$ and $\Delta\theta gF_{\_P1}$, a focal length of the positive lens P1 is $f_{\_P1}$, and $(\Delta\theta gF_{\_P1} \times f)/(f_{\_P1} \times \nu_{d\_P1})$ is a ratio $P_{\_P1}$, the positive lens P1 satisfies the following condition expressions:

$$-1.665 \times 10^{-7} \times \nu_{d\_P1}^3 + 5.213 \times 10^{-5} \times \nu_{d\_P1}^2 - 5.656 \times 10^{-3} \times \nu_{d\_P1} + 0.7006 < \theta gF_{\_P1} < -1.61783 \times 10^{-3} \times \nu_{d\_P1} + 0.64046$$

$$20 < \nu_{d\_P1} < 50$$

$$1 \times 10^{-4} < P_{\_P1} < 1 \times 10^{-3}.$$

According to the present invention, the rear attachment lens can be obtained in which variations of various aberrations, particularly variation of chromatic aberration, is small and high optical performance is maintained in an entire system when the rear attachment lens is mounted to the image side of the main lens system to increase the focal length of the entire system.

Further features of the present invention will become apparent from the following description of exemplary embodiments with reference to the attached drawings.

DESCRIPTION OF THE EMBODIMENTS

A rear attachment lens according to the present invention, an imaging optical system including the rear attachment lens mounted to a main lens system, and an image pickup apparatus using the imaging optical system will be described below. The rear attachment lens according to the present invention is detachably mounted to the image side of the main lens system, and changes the focal length of an entire system so as to become longer than that of the main lens system. The main lens system may be, for example, a telephoto lens or a telephoto zoom lens.

Figure 1:
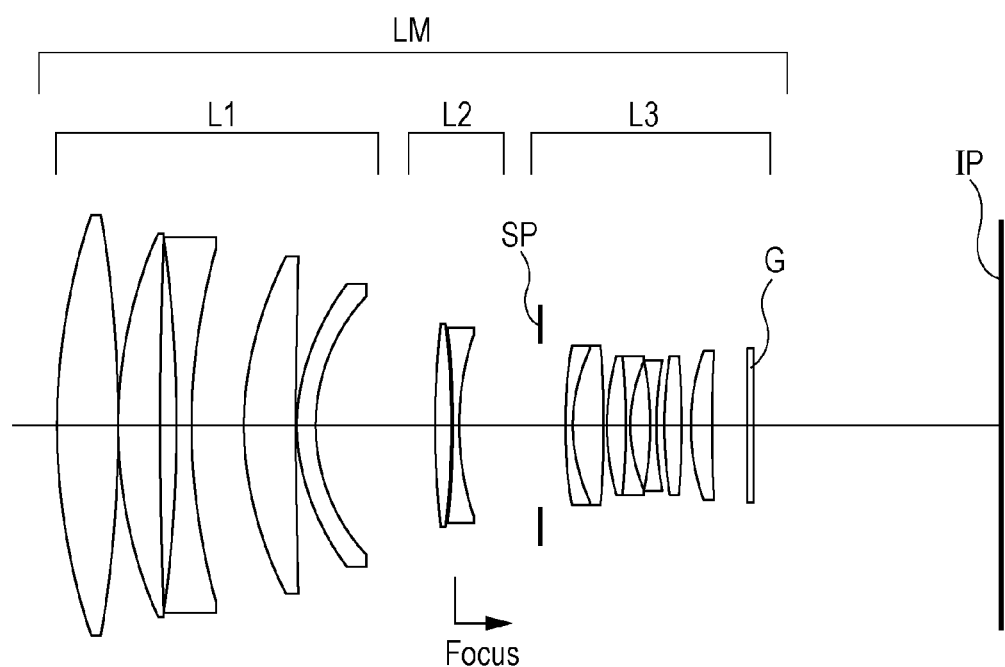
FIG. 1 is a lens sectional view of a main lens system.
Figure 2:
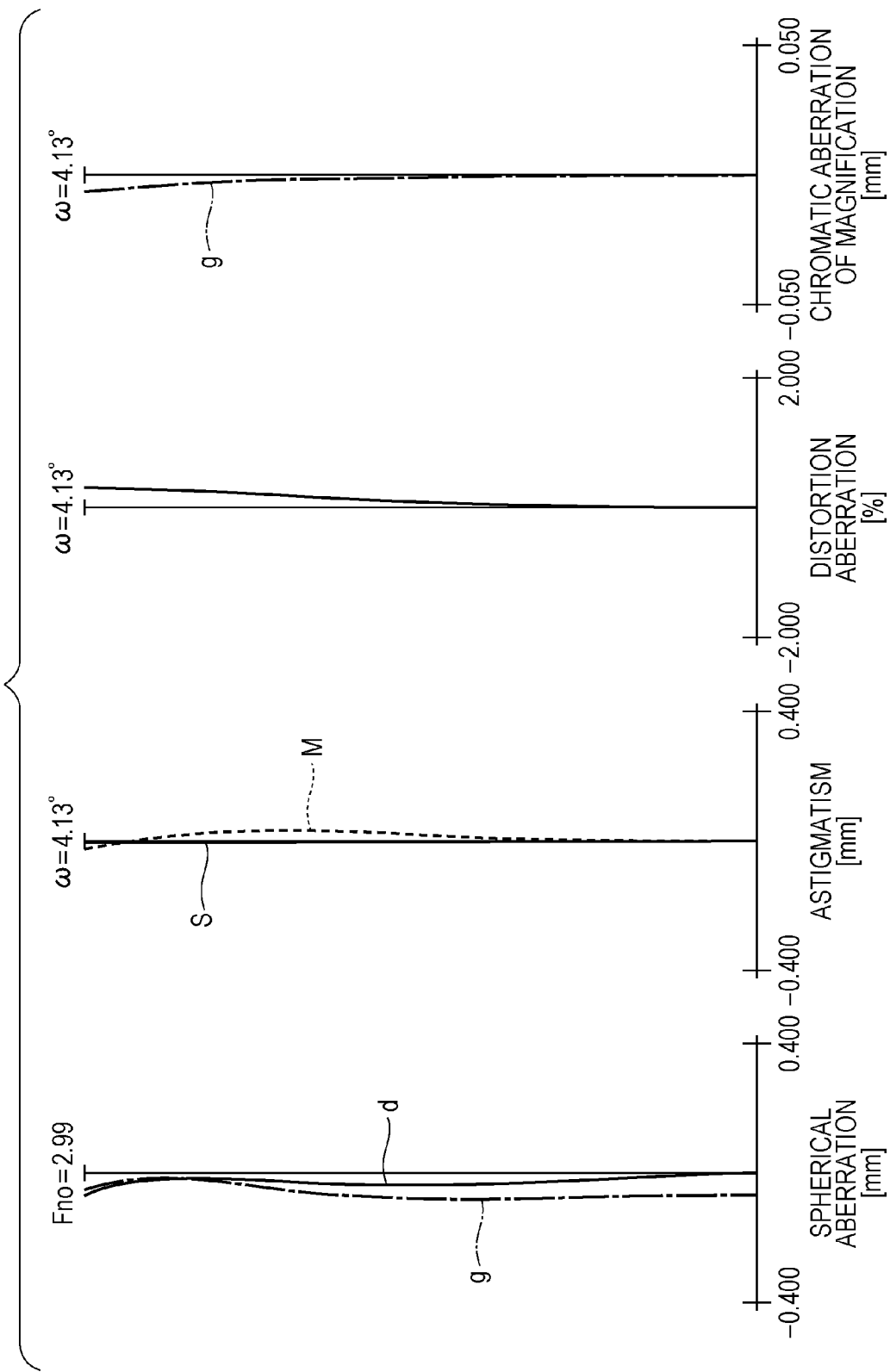
FIG. 2 illustrates various aberrations of the main lens system at an object distance of 15 m.
Figure 3:
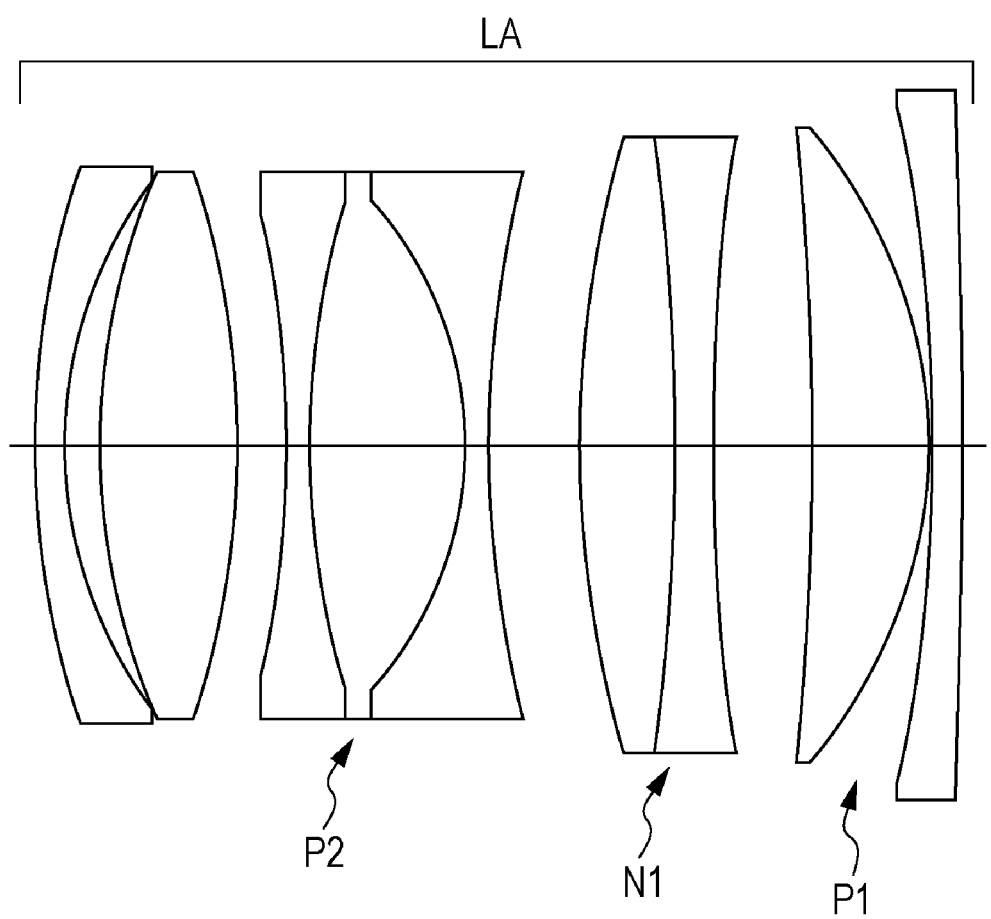
FIG. 3 is a lens sectional view of a rear attachment lens according to a first embodiment.
Figure 4:
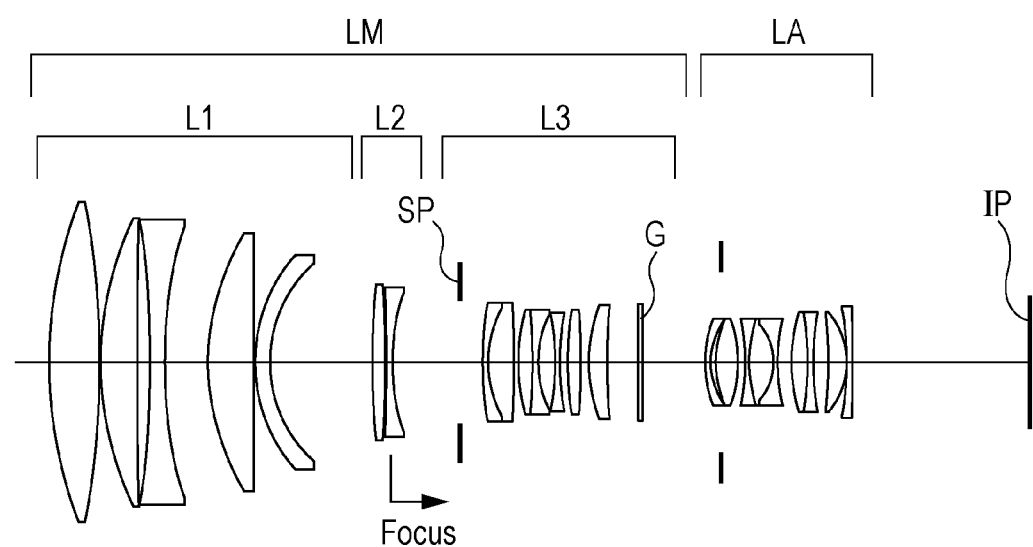
FIG. 4 is a lens sectional view when the rear attachment lens according to the first embodiment is mounted to the main lens system.
Figure 5:
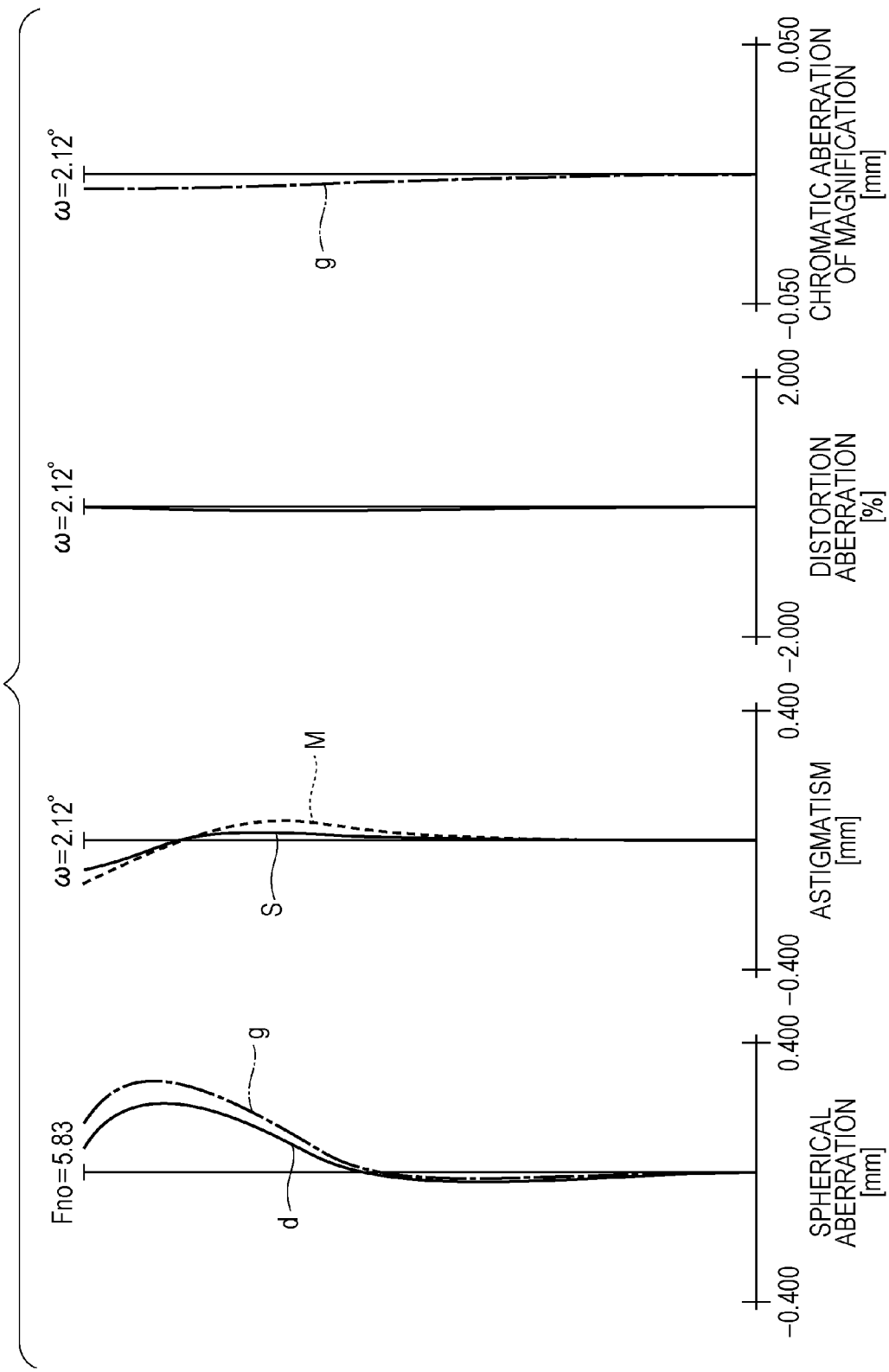
FIG. 5 illustrates various aberrations at an object distance of 30 m when the rear attachment lens according to the first embodiment is mounted to the main lens system.
Figure 6:
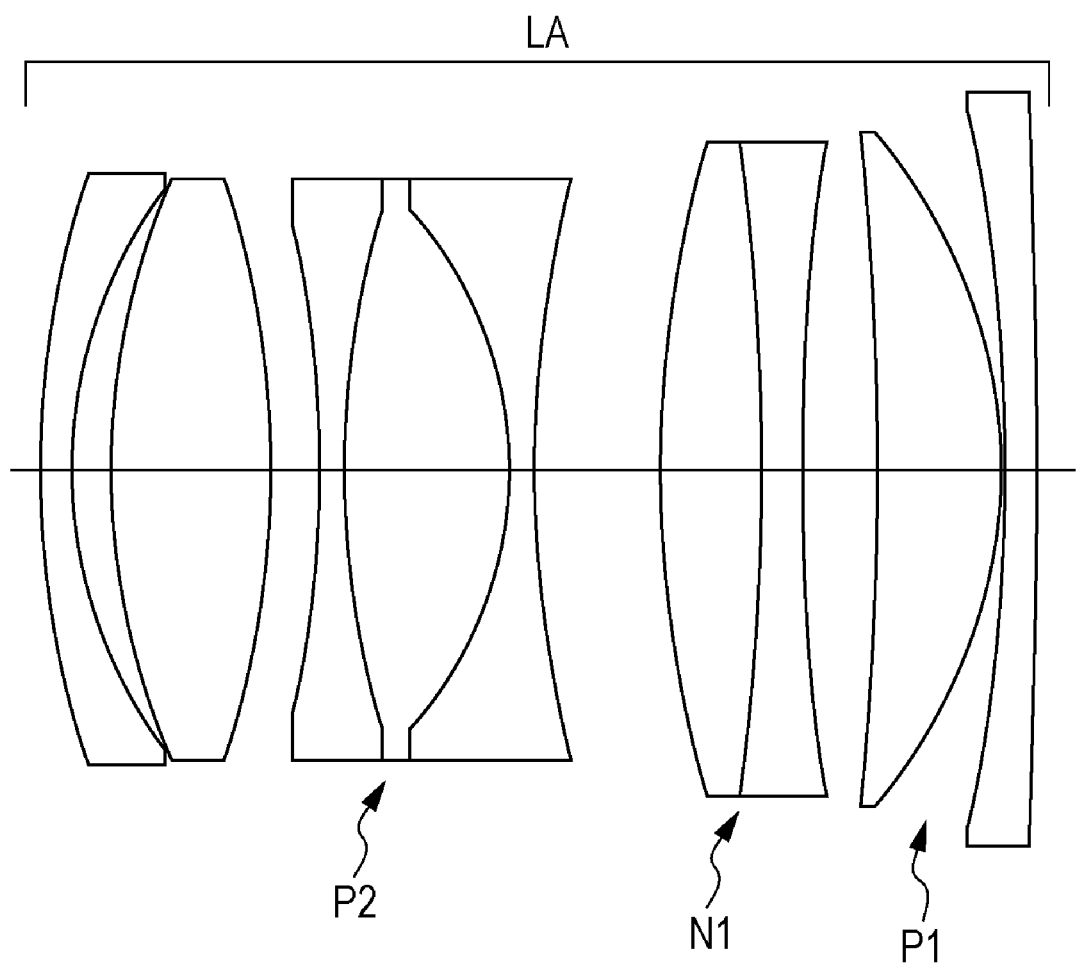
FIG. 6 is a lens sectional view of a rear attachment lens according to a second embodiment.
Figure 7:
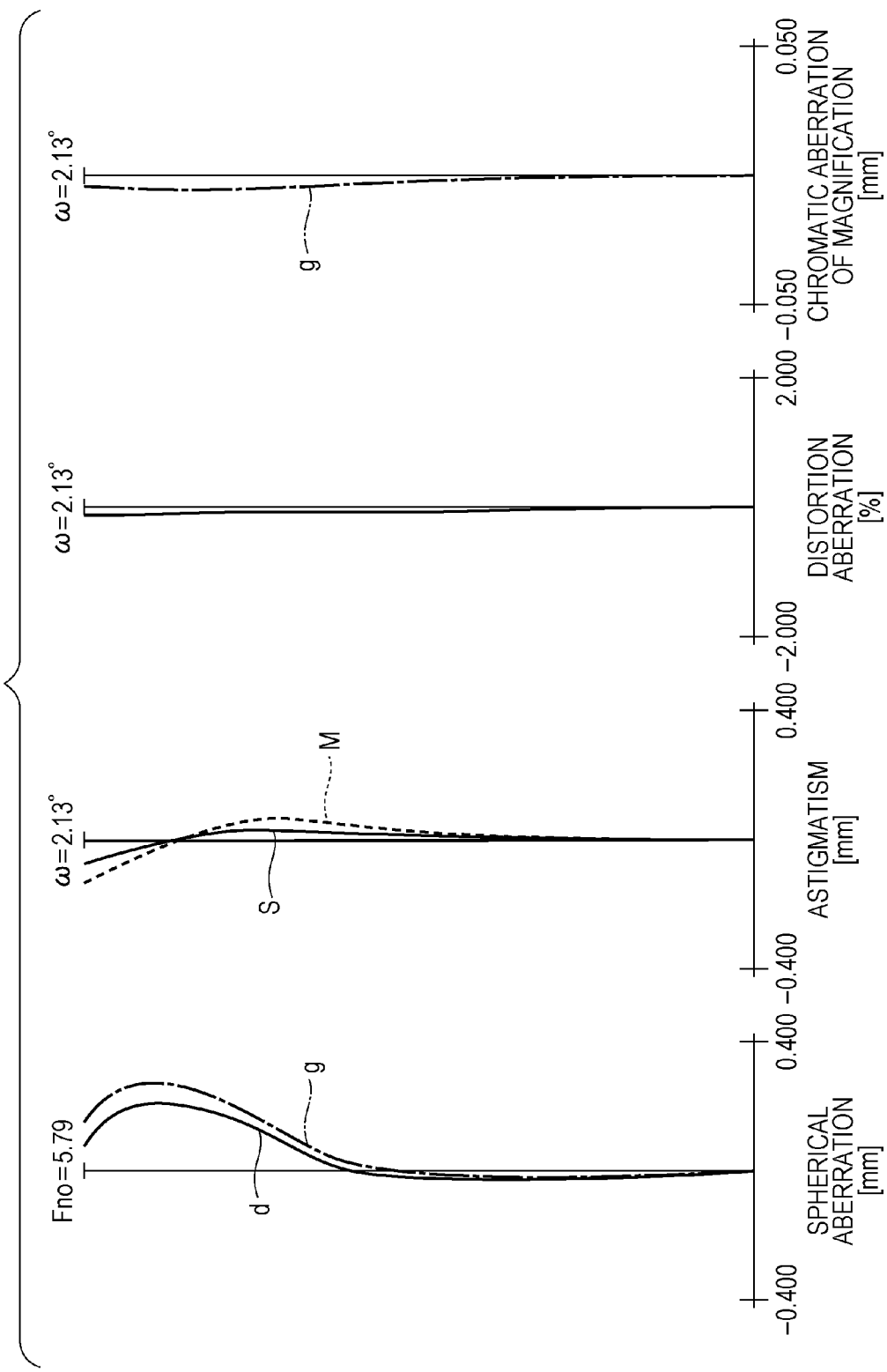
FIG. 7 illustrates various aberrations at the object distance of 30 m when the rear attachment lens according to the second embodiment is mounted to the main lens system.
Figure 8:
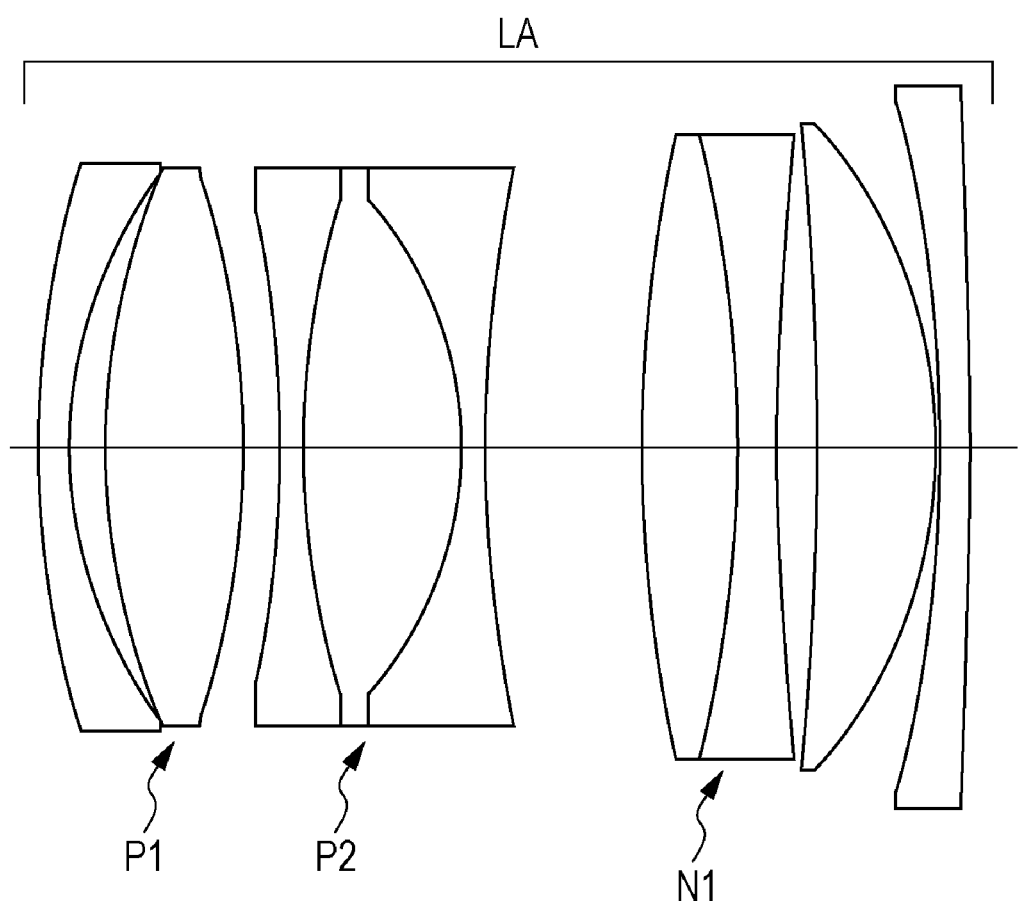
FIG. 8 is a lens sectional view of a rear attachment lens according to a third embodiment.
Figure 9:
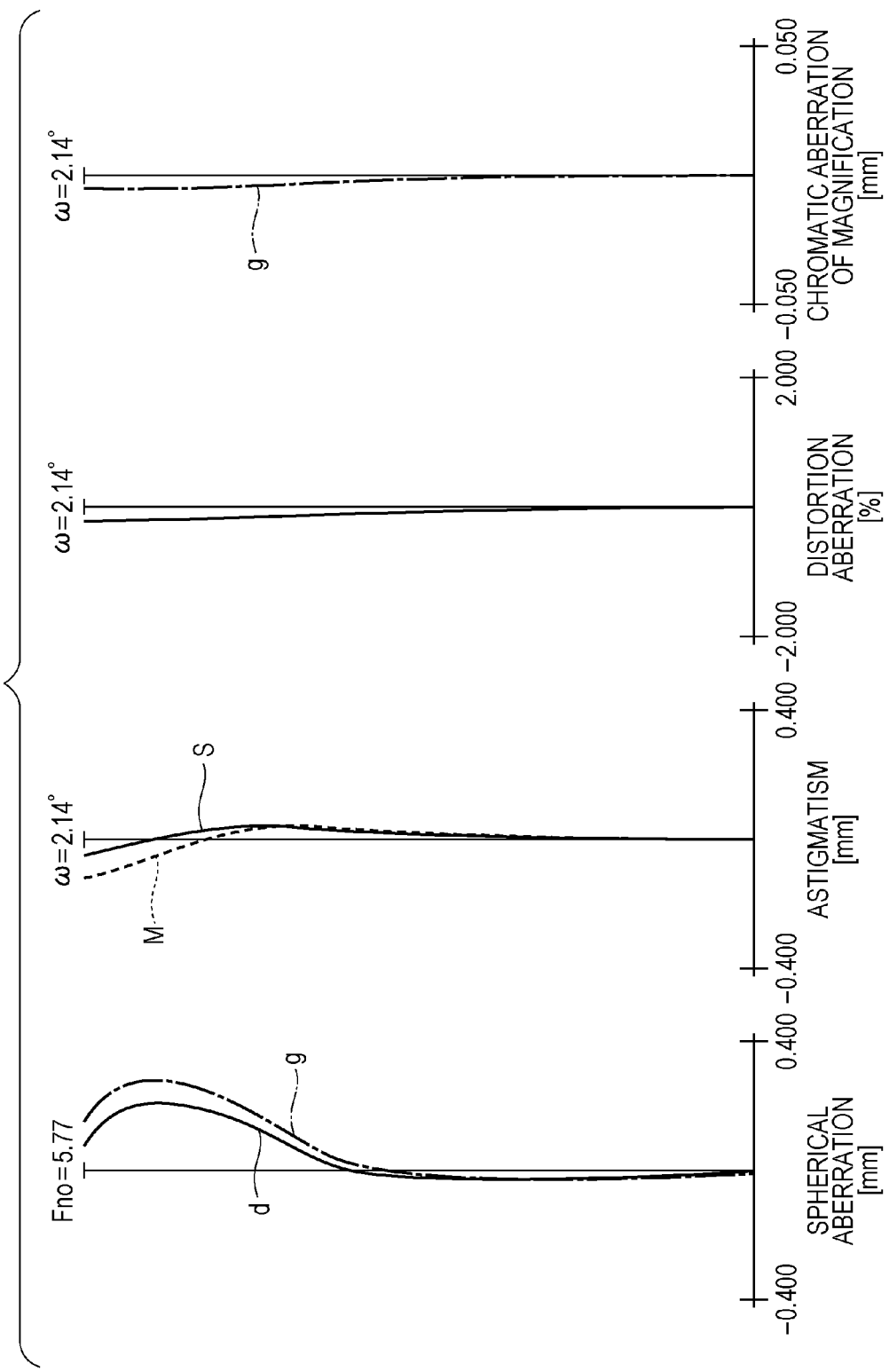
FIG. 9 illustrates various aberrations at the object distance of 30 m when the rear attachment lens according to the third embodiment is mounted to the main lens system.
Figure 10:
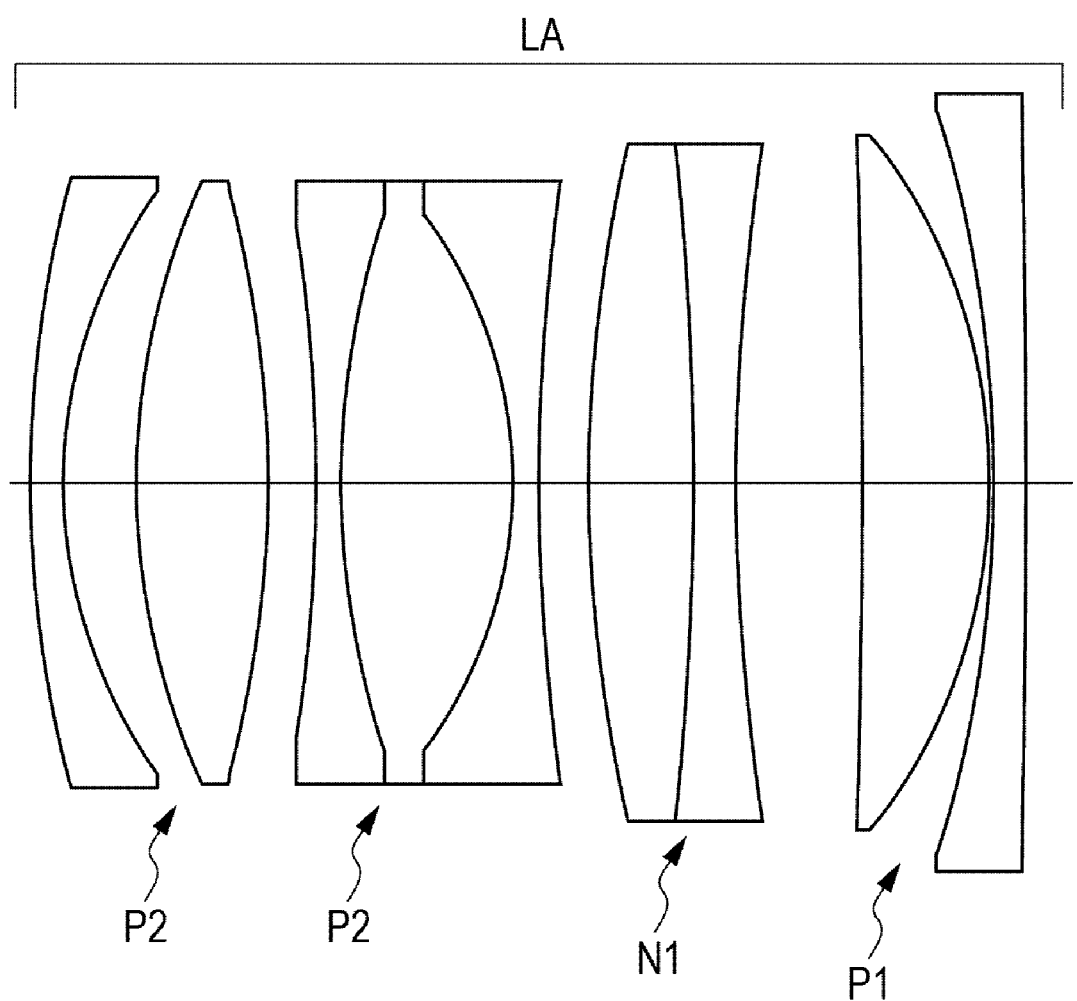
FIG. 10 is a lens sectional view of a rear attachment lens according to a fourth embodiment.
Figure 11:
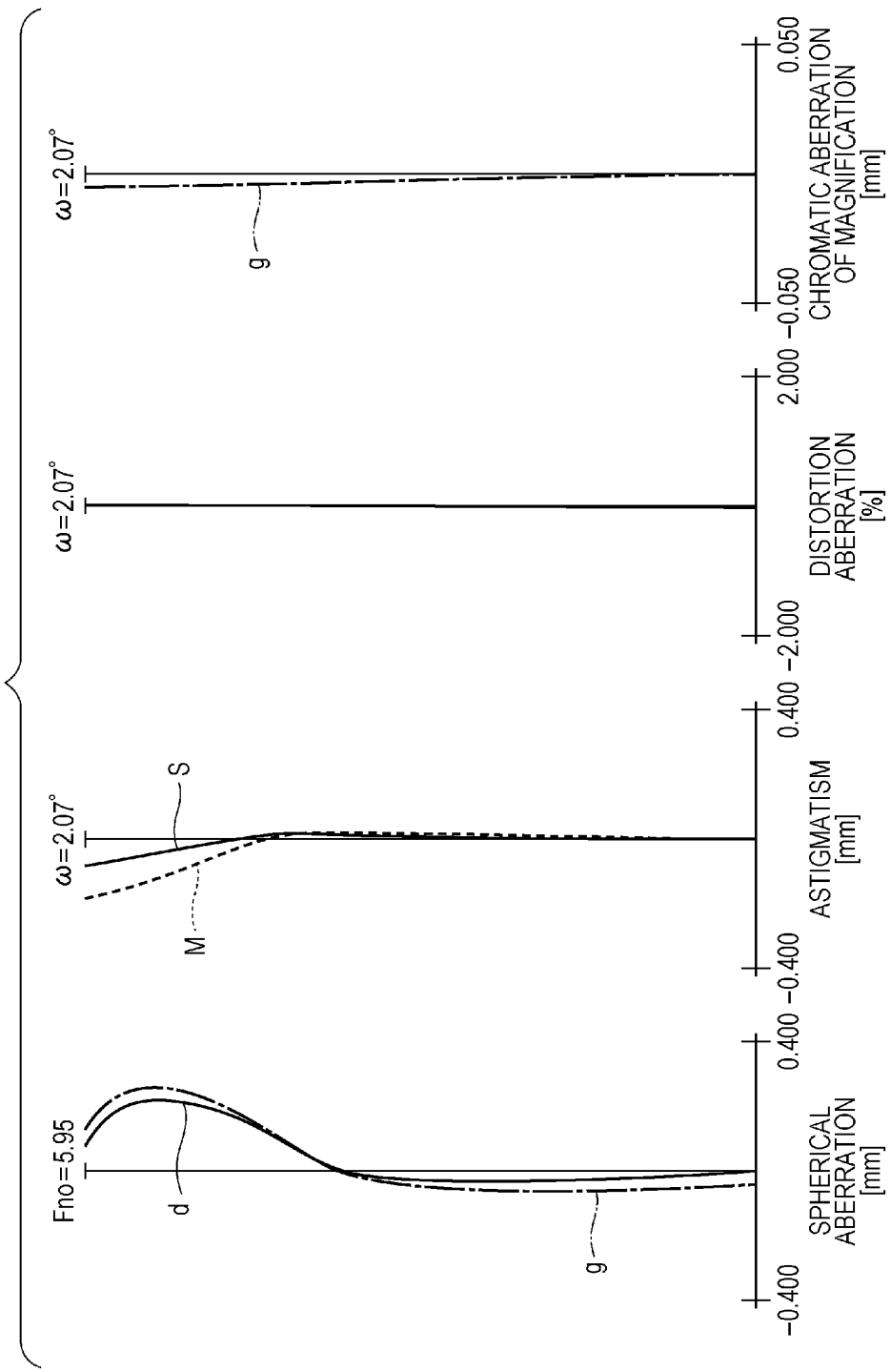
FIG. 11 illustrates various aberrations at the object distance of 30 m when the rear attachment lens according to the fourth embodiment is mounted to the main lens system.
Figure 12:
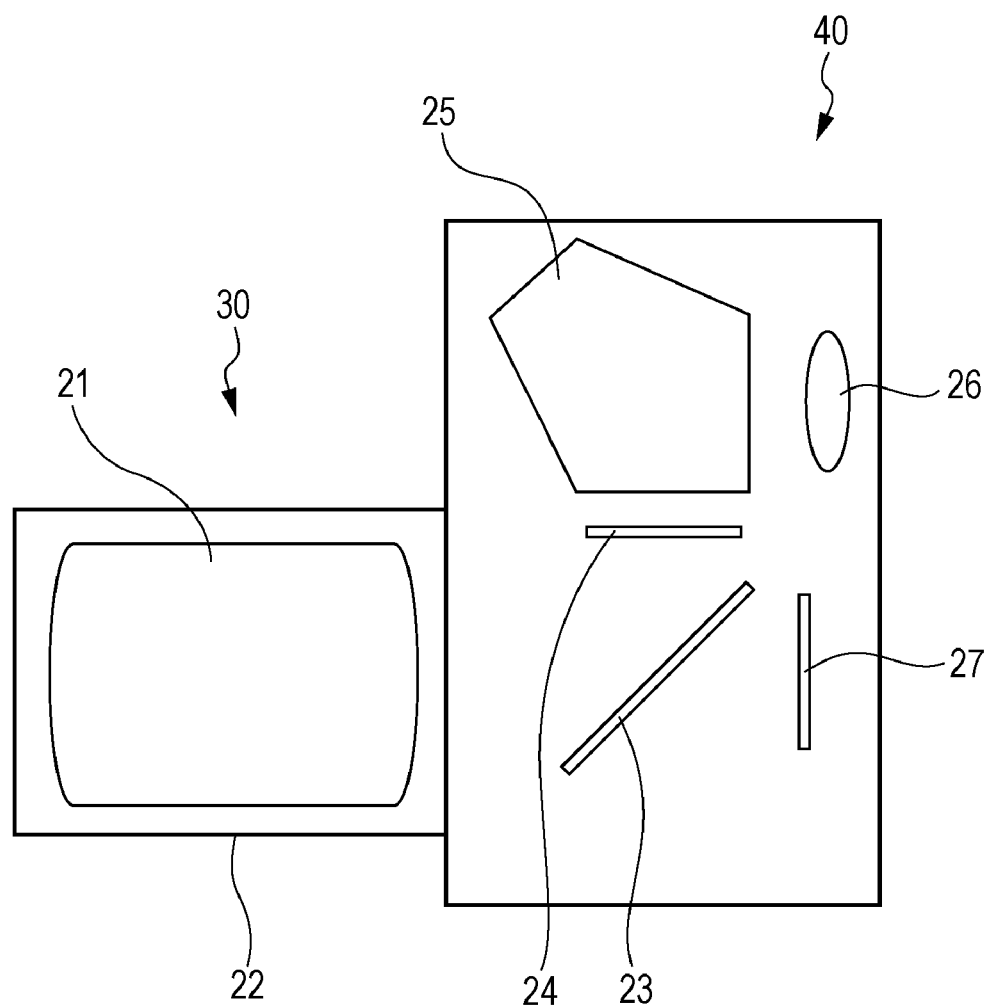
FIG. 12 is a schematic view illustrating an example of an image pickup apparatus including a rear attachment lens according to at least one embodiment of the present invention.

FIGS. 1 and 2 illustrate respectively a lens section and various aberrations of one example of a main lens system (telephoto lens) to which the rear attachment lens according to each embodiment of the present invention is mounted. FIG. 3 is a lens sectional view of a rear attachment lens according to a first embodiment of the present invention. FIG. 4 is a lens sectional view when the rear attachment lens according to the first embodiment of the present invention is mounted to the image side of the main lens system. FIG. 5 illustrates various aberrations at an object distance (i.e., a distance from an image plane) of 30 m when the rear attachment lens according to the first embodiment is mounted to the image side of the main lens system. FIGS. 6 and 7 illustrate respectively a lens section of a rear attachment lens according to a second embodiment of the present invention and various aberrations at the object distance (i.e., the distance from the image plane) of 30 m when the rear attachment lens according to the second embodiment is mounted to the image side of the main lens system. FIGS. 8 and 9 illustrate respectively a lens section of a rear attachment lens according to a third embodiment of the present invention and various aberrations at the object distance (i.e., the distance from the image plane) of 30 m when the rear attachment lens according to the third embodiment is mounted to the image side of the main lens system. FIGS. 10 and 11 illustrate respectively a lens section of a rear attachment lens according to a fourth embodiment of the present invention and various aberrations at the object distance (i.e., the distance from the image plane) of 30 m when the rear attachment lens according to the fourth embodiment is mounted to the image side of the main lens system. FIG. 12 is a schematic view illustrating an example of a single-lens reflex camera system in which the rear attachment lens according to the present invention is mounted between the main lens system and a main body of the camera.

In the lens sectional view, the left side represents the object side and the right side represents the image side. LA denotes the rear attachment lens. LM denotes the main lens system (master lens) that is a telephoto lens having a single focal length. The main lens system LM includes a first lens unit L1 having a positive refractive power, a second lens unit L2 made up of a positive lens and a negative lens and having a negative refractive power, and a third lens unit L3 having a positive refractive power, those lens units being arranged successively from the object side toward the image side. Focusing over a range from an object at infinity to a near object is performed by moving the second lens group L2 along an optical axis toward the image plane side. SP denotes an aperture stop. G denotes an optical block corresponding to an optical filter, a protective glass, etc. IP denotes an image plane that corresponds to an image pickup surface of a solid-state image pickup element (photoelectric conversion element), such as a CCD sensor or a CMOS sensor, which receives a light image when the main lens system is used as an imaging optical system of a video camera or a digital camera. Alternatively, when the main lens system is used as an imaging optical system of a silver-halide film camera, the image plane corresponds to a film surface. In the rear attachment lens LA, P1 and P2 each denote a positive lens and N1 denotes a negative lens.

In each of aberration charts, "d" and "g" represent respectively a d-line and a g-line. M and S represent respectively a meridional image plane and a sagittal image plane. The chromatic aberration of magnification is represented by the g-line. Fno denotes an F-number, and ω denotes a half angle of view. Further, in all the aberration charts, spherical aberration is plotted at a scale of 0.4 mm, astigmatism is plotted at a scale of 0.4 mm, distortion aberration is plotted at a scale of 2%, and chromatic aberration of magnification is plotted at a scale of 0.05 mm.

The present invention is based on the following concept. The problem encountered in the past when the rear attachment lens is used is how to reduce the chromatic aberration of magnification. It has hitherto been general practice to use, in a positive lens of the rear attachment lens, high-dispersion lead glass or Ti-based glass material at a relatively large proportion in order to maintain a balance between the axial chromatic aberration and the chromatic aberration of magnification. From the viewpoint of satisfying the demand for higher image quality in recent digital cameras, however, it has been confirmed that the secondary spectrum of the chromatic aberration of magnification cannot be satisfactorily corrected when the above-mentioned glass material is used.

The present invention has solved the above-described problem based on the finding that the secondary spectrum of the chromatic aberration of magnification can be reduced by using, as the positive lens in the rear attachment lens, a glass material that has high dispersion and has a partial dispersion ratio (amount of dispersion at a given wavelength range) smaller than the partial dispersion ratio of lead glass and the Ti-based glass materials. The present invention has succeeded in improving image quality by using the glass material having such properties as the positive lens that most effectively contributes to correction of the chromatic aberration of magnification.

In the present invention, the chromatic aberration of magnification is reduced by satisfying the following predetermined condition expressions on the basis of the above-described concept. Thus, in the rear attachment lenses according to embodiments of the present invention, when the following conditions are satisfied, the chromatic aberration of magnification is optimally minimized and high quality images are obtained.

The rear attachment lens LA includes one or more positive lenses GMp. The Abbe number and a partial dispersion ratio difference of a material of the one or more positive lenses GMp are respectively defined as $v_{d\_P}$ and $\Delta\theta F_{\_P}$, a focal length of the positive lens GMp is $f_{\_P}$, a focal length of the rear attachment lens is f, and $(\Delta\theta F_{\_P} \times f)/(f_{\_P} \times v_{d\_P})$ is a ratio P. One lens among the one or more positive lenses GMp having a maximum ratio P is a positive lens P1. The Abbe number, a partial dispersion ratio, and a partial dispersion ratio difference of a material of the positive lens P1 are respectively defined as $v_{d\_P1}$, $\Delta\theta F_{\_P1}$ and $\Delta\theta F_{\_P1}$, a focal length of the positive lens P1 is $f_{\_P1}$, and $(\Delta\theta F_{\_P1} \times f)/(f_{\_P1} \times v_{d\_P1})$ is a ratio $P_{\_P1}$. Given the foregoing definitions, the positive lens P1 of the rear attachment lens satisfies the following conditional expressions:

$$-1.665 \times 10^{-7} \times v_{d\_P1}^3 + 5.213 \times 10^{-5} \times v_{d\_P1}^2 - 5.656 \times 10^{-3} \times v_{d\_P1} + 0.7006 < \theta gF_{\_P1} < -1.61783 \times 10^{-3} \times v_{d\_P1} + 0.64046 \quad (1)$$

$$20 < v_{d\_P1} < 50 \quad (2)$$

$$1 \times 10^{-4} < P_{\_P1} < 1 \times 10^{-3} \quad (3)$$

The Abbe number and the refractive index of each lens material of the one or more GMp lenses are established on the basis of the d-line. The Abbe number $v_{d\_P}$, the partial dispersion ratio $\theta gF_{\_P}$, and the partial dispersion ratio difference (anomalous partial dispersion ratio) $\Delta\theta gF_{\_P}$ of the material of the positive lens GMp are expressed as given below. Further, the Abbe number $v_{d\_P1}$, the partial dispersion ratio $\theta gF_{\_P1}$, the partial dispersion ratio difference (anomalous partial dispersion ratio) $\Delta\theta gF_{\_P1}$, and the ratio $P_{\_P1}$ of the material of the positive lens P1 are expressed as given below.

In addition, the refractive index of the material of the positive lens GMp at the d-line is defined as $N_{d\_P}$, the refractive index thereof at the g-line is defined as $N_{g\_P}$, the refractive index thereof at the C-line is defined as $N_{C\_P}$, and the refractive index thereof at the F-line is defined as $N_{F\_P}$. The focal length of the positive lens P1 is defined as $f_{\_P1}$. Further, the refractive index of the material of the positive lens P1 at the d-line is defined as $N_{d\_P1}$, the refractive index thereof at the g-line is defined as $N_{g\_P1}$, the refractive index thereof at the C-line is defined as $N_{C\_P1}$, and the refractive index thereof at the F-line is defined as $N_{F\_P1}$. When the further premised definitions of the refractive index are maintained, the following formulae are held true:

$$v_{d\_P} = (N_{d\_P} - 1)/(N_{F\_P} - N_{C\_P})$$

$$v_{d\_P1} = (N_{d\_P1} - 1)/(N_{F\_P1} - N_{C\_P1})$$

$$\theta gF_{\_P} = (N_{g\_P} - N_{F\_P})/(N_{F\_P} - N_{C\_P})$$

$$\theta gF_{\_P1} = (N_{g\_P1} - N_{F\_P1})/(N_{F\_P1} - N_{C\_P1})$$

$$\Delta\theta gF_{\_P} = \theta gF_{\_P} - (-1.61783 \times 10^{-3} \times v_{d\_P} + 0.64146)$$

$$\Delta\theta gF_{\_P1} = \theta gF_{\_P1} - (-1.61783 \times 10^{-3} \times v_{d\_P1} + 0.64146)$$

$$P_{\_P1} = (\Delta\theta gF_{\_P1} \times f)/(f_{\_P1} \times v_{d\_P1})$$

More specifically, when the refractive index of the material of the positive lens P1 at the d-line is $N_{d\_P1}$, the condition expression of:

$$1.45 < N_{d\_P1} < 1.76 \quad (4)$$

is satisfied.

In addition to the one or more positive lenses GMp, the rear attachment lens LA further includes at least one or more negative lenses GMn.

The Abbe number and a partial dispersion ratio difference of a material of the negative lens GMn are respectively $v_{d\_N}$ and $\theta gF_{\_N}$, a focal length of the negative lens GMn is $f_{\_N}$, and $(\Delta\theta gF_{\_N} \times f)/(f_{\_N} \times v_{d\_N})$ is a ratio N. One of the one or more negative lenses GMn having a maximum ratio N is a negative lens N1. The Abbe number and a partial dispersion ratio difference of a material of the negative lens N1 are respectively $v_{d\_N1}$ and $\Delta\theta gF_{\_N1}$, and a focal length of the negative lens N1 is $f_{\_N1}$. Based on the foregoing premised definitions, the negative lens N1 of the rear attachment lens LA satisfies the following condition expressions:

$$0 < (\Delta\theta gF_{\_P}/(f_{\_P1} \times v_{d\_P1}))/(\Delta\theta gF_{\_N1}/(f_{\_N1} \times v_{d\_N1})) < 10 \quad (5)$$

The Abbe number and the refractive index of each lens material of the one or more negative lenses GMn are determined on the basis of the d-line. The Abbe number $v_{d\_N}$, the partial dispersion ratio $\theta gF_{\_N}$, and the partial dispersion ratio difference (anomalous partial dispersion ratio) $\Delta\theta gF_{\_N}$ of the material of the negative lens GMn are expressed as given below. Further, the Abbe number $v_{d\_N1}$, the partial dispersion ratio $\theta gF_{\_N1}$, and the partial dispersion ratio difference (anomalous partial dispersion ratio) $\Delta\theta gF_{\_N1}$ of the material of the negative lens GMn are expressed as given below.

In addition, the refractive index of the material of the negative lens GMn at the d-line is defined as $N_{d\_N}$, the refractive index thereof at the g-line is defined as $N_{g\_N}$, the refractive index thereof at the C-line is defined as $N_{C\_N}$, and the refractive index thereof at the F-line is defined as $N_{F\_N}$. Further, the refractive index of the material of the negative lens N1 at the d-line is defined as $N_{d\_N1}$, the refractive index thereof at the g-line is defined as $N_{g\_N1}$, the refractive index thereof at the C-line is defined as $N_{C\_N1}$, and the refractive index thereof at the F-line is defined as $N_{F\_N1}$. Based on the foregoing definitions, the following formulae are held true:

$$v_{d\_N} = (N_{d\_N} - 1)/(N_{F\_N} - N_{C\_N})$$

$$v_{d\_N1} = (N_{d\_N1} - 1)/(N_{F\_N1} - N_{C\_N1})$$

$$\theta gF_{\_N} = (N_{g\_N} - N_{F\_N})/(N_{F\_N} - N_{C\_N})$$

$$\theta gF_{\_N1} = (N_{g\_N1} - N_{F\_N1})/(N_{F\_N1} - N_{C\_N1})$$

$$\Delta\theta gF_{\_N} = \theta gF_{\_N} - (-1.61783 \times 10^{-3} \times v_{d\_N} + 0.64146)$$

$$\Delta\theta gF_{\_N1} = \theta gF_{\_N1} - (-1.61783 \times 10^{-3} \times v_{d\_N1} + 0.64146)$$

Moreover, a distance from the surface vertex on the object side of one among the lenses in the rear attachment lens, which is positioned nearest to the object side end, to the surface vertex on the image side of one among those lenses, which is positioned nearest to the image side end, is $d_0$. Also, a distance from the surface vertex on the object side of the one among the lenses in the rear attachment lens, which is positioned nearest to the object side end, to the surface vertex on the object side of the negative lens N1 is $d_{N1}$. On those conditions, more preferably, the conditional expression of:

$$0.5 < d_{N1}/d_0 < 1.0 \quad (6)$$

is satisfied.

Even more preferably, a refractive index and an Abbe number of the material of the negative lens N1 at the d-line are respectively $N_{d\_N1}$ and $v_{d\_N1}$, the condition expressions of:

$$10 < v_{d\_N1} < 30 \quad (7)$$

$$1.65 < N_{d\_N1} < 2.30 \quad (8)$$

are satisfied.

In addition to the above-described lenses, the rear attachment lens LA may further include at least one positive lens P2 in addition to the positive lens P1.

The Abbe number and a refractive index of a material of the positive lens P2 are respectively $v_{d\_P2}$ and $N_{d\_P2}$. Further, a distance from the surface vertex on the object side of one among the lenses in the rear attachment lens, which is positioned nearest to the object side end, to the surface vertex on the object side of the positive lens P2 is $d_{P2}$. Accordingly, the conditional expressions of:

$$10 < \nu_{d\_P2} < 40 \quad (9)$$

$$1.45 < N_{d\_P2} < 1.75 \quad (10)$$

$$0 \leq d_{P2}/d_0 < 0.5 \quad (11)$$

are satisfied.

Even more preferably, when a partial dispersion ratio difference of a material of the positive lens P2 is $\Delta\theta gF_{\_P2}$ and a focal length of the positive lens P2 is $f_{\_P2}$, the conditional expression of:

$$-0.004 < \Delta\theta gF_{\_P2} \times f/(f_{\_P2} \times \nu_{d\_P2}) < -0.0005 \quad (12)$$

is satisfied.

The Abbe number and the refractive index of each lens material are determined on the basis of the d-line. The Abbe number $\nu_{d\_P2}$, the partial dispersion ratio $\theta gF_{\_P2}$, and the partial dispersion ratio difference (anomalous partial dispersion ratio) $\Delta\theta gF_{\_P2}$ of the material of the positive lens P2 are expressed as given below. In addition, the refractive index of the material of the positive lens P2 at the d-line is defined as $N_{d\_P2}$, the refractive index thereof at the g-line is defined as $N_{g\_P2}$, the refractive index thereof at the C-line is defined as $N_{C\_P2}$, and the refractive index thereof at the F-line is defined as $N_{F\_P2}$. From the above definitions, the following formulae are held:

$$\nu_{d\_P2} = (N_{d\_P2} - 1)/(N_{E\_P2} - N_{C\_P2})$$

$$\theta gF_{\_P2} = (N_{g\_P2} - N_{F\_P2})/(N_{F\_P2} - N_{C\_P2})$$

$$\Delta\theta gF_{\_P2} = \theta gF_{\_P2} - (-1.61783 \times 10^{-3} \times \nu_{d\_P2} + 0.64146)$$

The feature of the lens arrangement in each embodiment will be described below. The rear attachment lens LA according to each embodiment includes a pair of negative lens and positive lens, a cemented lens formed by cementing a negative lens, a positive lens, and a negative lens to each other, a cemented lens formed by cementing a positive lens and a negative lens to each other, and a pair of a positive lens and a negative lens, those lenses being arranged successively from the outermost position on the object side toward the image side.

In the first embodiment of FIG. 3, one of the positive lenses, which is positioned nearest to the image side end, corresponds to the positive lens P1, one of the negative lenses, which is positioned second nearest to the image side end in the entire system, corresponds to the negative lens N1, and one of the positive lenses, which is positioned second nearest to the object side end, corresponds to the positive lens P2.

In the second embodiment of FIG. 6, one of the positive lenses, which is positioned nearest to the image side end, corresponds to the positive lens P1, one of the negative lenses, which is positioned second nearest to the image side end in the entire system, corresponds to the negative lens N1, and one of the positive lenses, which is positioned second nearest to the object side end, corresponds to the positive lens P2.

In the third embodiment of FIG. 8, one of the positive lenses, which is positioned nearest to the object side end, corresponds to the positive lens P1, one of the negative lenses, which is positioned second nearest to the image side end in the entire system, corresponds to the negative lens N1, and one of the positive lenses, which is positioned second nearest to the object side end, corresponds to the positive lens P2.

In the fourth embodiment of FIG. 10, one of the positive lenses, which is positioned nearest to the image side end, corresponds to the positive lens P1, one of the negative lenses, which is positioned second nearest to the image side end in the entire system, corresponds to the negative lens N1, and two of the positive lenses, which are positioned nearest and second nearest to the object side end, correspond to the positive lens P2.

In general, the rear attachment lens mounted between the main lens system and the camera to increase the focal length has such a tendency that, in the lens unit positioned nearest to the object side end, an axial ray has a large height of incidence and an off-axis principal ray passes a position away from the optical axis. Further, there is a tendency that, in the lens unit positioned nearer to the image side end, the height of incidence of the axial ray lowers and the off-axis principal ray passes a position farther away from the optical axis. Accordingly, correction of the chromatic aberration is performed by correcting the axial chromatic aberration with the lens unit positioned nearest to the object side end, and by correcting the chromatic aberration of magnification with the lens unit on the image side. However, because the correction direction of the axial chromatic aberration and the correction direction of the chromatic aberration of magnification are contradictory to each other, those aberrations have to be corrected in a balanced manner.

In order to satisfactorily correct the chromatic aberration of magnification in such a circumstance, it is usually proposed to arrange an anomalous-dispersion glass, e.g., fluorite, with a negative power at a position where the off-axis principal ray passes away from the optical axis. However, most of anomalous-dispersion glasses, including fluorite, are low in both the refractive index and the dispersion. In trying to effectively correct the chromatic aberration of magnification, therefore, a substantially great power has to be developed. This reduces the radius of curvature of the lens surface and makes it difficult to correct other aberrations than the chromatic aberration of magnification. Further, because the low refractive index acts to degrade the Petzval sum, curving of the image plane, in particular, becomes difficult to correct.

In view of the above points, the rear attachment lens LA according to each embodiment employs the positive lens P1 having a negative partial dispersion ratio difference $\Delta\theta F_{\_P1}$ and a proper power. As a result, the chromatic aberration of magnification, in particular, is satisfactorily corrected.

With the lens arrangement described above, the rear attachment lens having high optical performance can be provided while the chromatic aberration of magnification is reduced in the entire imaging optical system. More preferably, even higher optical performance can be obtained by employing the following arrangement.

Because the chromatic aberration of magnification can be corrected by the positive lens P1 as described above, there is no need of using the anomalous-dispersion glass, e.g., fluorite, as the negative lens N1. By using a high-dispersion glass as the negative lens N1, therefore, chromatic variations in the spherical aberration can also be easily corrected. Further, the chromatic aberration of magnification can be more effectively corrected by using, as the negative lens N1, a material that has a larger partial dispersion ratio difference $\Delta\theta gF_{\_N1}$ in the positive direction.

Thus, chromatic variations in the spherical aberration is corrected by using, as the negative lens N1, the material having high dispersion, and the chromatic aberration of magnification is corrected by using, as the negative lens N1, the material having a large partial dispersion ratio difference $\Delta\theta F_{\_N1}$. Accordingly, the chromatic aberration in the entire lens system can be more satisfactorily corrected by employing the negative lens N1 that contributes to correcting the chromatic aberration of magnification in addition to the positive lens P1.

As described above, the chromatic aberration of magnification and the axial chromatic aberration are contradictory to each other in their directions. Therefore, when the chromatic aberration of magnification is corrected by using the positive lens P1, the axial chromatic aberration is rather enlarged. In each embodiment, even more preferably, the positive lens P2 having higher dispersion is arranged at a position relatively near the object side end within the rear attachment lens where the height of incidence of the axial ray is high and the height of incidence of the off-axis principal ray is low. As a result, the axial chromatic aberration can be corrected and higher optical performance can be obtained.

Technical meanings of the above-mentioned condition expressions will be described below. The condition expression (1) relates to the partial dispersion ratio of the positive lens P1 in the rear attachment lens LA. If the upper limit value of the condition expression (1) is exceeded, the anomalous dispersion of the positive lens P1 would be reduced and the power of correcting the chromatic aberration of magnification would be weakened. This would require a greater power to correct the chromatic aberration of magnification and would make it difficult to keep balance in correction between the chromatic aberration of magnification and the other aberrations. On the other hand, if the lower limit value of the condition expression (1) is exceeded, the anomalous dispersion of the positive lens P1 would be too large and the chromatic aberration of magnification would be corrected overly.

The condition expression (2) relates to the Abbe number of the positive lens P1 in the rear attachment lens LA. If the upper or lower limit value of the condition expression (2) is exceeded, it would be difficult to keep balance in correction between the chromatic aberration of magnification and the axial chromatic aberration. The condition expression (2) is more preferably set as follows:

$$25 < v_{d\_P1} < 50 \tag{2a}$$

Even more preferably, the condition expression (2a) is set as follows:

$$30 < v_{d\_P1} < 50 \tag{2b}$$

The condition expression (3) relates to the chromatic-aberration corrective power of the positive lens P1 in the rear attachment lens LA. If the upper limit value of the condition expression (3) is exceeded, it would be difficult to keep balance in correction between the chromatic aberration of magnification and the axial chromatic aberration. If the lower limit value of the condition expression (3) is exceeded, the chromatic-aberration corrective power would be too weak and a greater power would be required to correct the chromatic aberration of magnification, thus causing unbalance in correction between the chromatic aberration of magnification and the other aberrations. The condition expression (3) is more preferably set as follows:

$$1.5 \times 10^{-4} < P_{\_P1} < 6 \times 10^{-4} \tag{3a}$$

While the rear attachment lens intended by the present invention can be achieved with the above-described settings, at least one of the following condition expressions (4) to (12) is preferably satisfied. As a result, even higher optical performance can be obtained.

The condition expression (4) relates to the refractive index of the material of the positive lens P1 in the rear attachment lens LA. If the upper limit value of the condition expression (4) is exceeded, it would be difficult to keep balance in correction between the chromatic aberration of magnification and the curving of the image plane. If the lower limit value of the condition expression (4) is exceeded, a greater power would be required to correct the chromatic aberration of magnification because the refractive index is low. Accordingly, the radius of curvature of the lens surface would be reduced, thus making it difficult to keep balance in correction between the chromatic aberration of magnification and the other aberrations including the spherical aberration. The condition expression (4) is more preferably set as follows:

$$1.5 < N_{d\_P1} < 1.76 \tag{4a}$$

Even more preferably, the condition expression (4a) is set as follows:

$$1.5 < N_{d\_P1} < 1.75 \tag{4b}$$

The condition expression (5) relates to balance in power for correcting the chromatic aberration between the positive lens P1 and the negative lens N1 in the rear attachment lens LA. If the upper or lower limit value of the condition expression (5) is exceeded, it would be difficult to keep balance in power for correcting the chromatic aberration between the positive lens P1 and the negative lens N1. Hence, satisfactory correction of the chromatic aberration would be difficult to realize. The condition expression (5) is more preferably set as follows:

$$0 < (\Delta\theta gF_{\_P1}/(f_{\_P1} \times v_{d\_P1}))/(\Delta\theta gF_{\_N1}/(f_{\_N1} \times v_{d\_N1})) < 5 \tag{5a}$$

Even more preferably, the condition expression (5a) is set as follows:

$$0 < (\Delta\theta gF_{\_P1}/(f_{\_P1} \times v_{d\_P1}))/(\Delta\theta gF_{\_N1}/(f_{\_N1} \times v_{d\_N1})) < 5 \tag{5b}$$

The condition expression (6) relates to the position where the negative lens N1 is arranged in the rear attachment lens LA. Because the upper limit value of the condition expression (6) represents the negative lens N1 that is positioned at the image side end in the rear attachment lens, it is not exceeded in practice. If the lower limit value of the condition expression (6) is exceeded, this implies that the negative lens N1 is arranged at a position in the rear attachment lens where the height of incidence of the axial ray is high. Accordingly, when trying to satisfactorily correct the chromatic aberration of magnification, the axial chromatic aberration would be increased, thus raising a difficulty in keeping balance in correction between the chromatic aberration of magnification and the axial chromatic aberration. The condition expression (6) is more preferably set as follows:

$$0.6 < d_{N1}/d_0 < 0.9 \tag{6a}$$

The condition expression (7) relates to the Abbe number of the negative lens N1 in the rear attachment lens LA. If the upper limit value of the condition expression (7) is exceeded, it would be difficult to satisfactorily correct the chromatic aberration of magnification. If the lower limit value of the condition expression (7) is exceeded, the chromatic aberration of magnification could be satisfactorily corrected, but it would be difficult to keep balance in correction between the chromatic aberration of magnification and the axial chromatic aberration. The condition expression (7) is more preferably set as follows:

$$10 < v_{d\_N1} < 27 \tag{7a}$$

The condition expression (8) relates to the refractive index of the material of the negative lens N1 in the rear attachment lens LA. If the upper limit value of the condition expression (8) is exceeded, it would be difficult to obtain an optical material that is relatively easy to machine as desired. If the lower limit value of the condition expression (8) is exceeded, it would be difficult to keep balance in correction between the chromatic aberration of magnification and the curving of the image plane. The condition expression (8) is more preferably set as follows:

$$1.75 < N_{d\_N1} < 2.30 \quad (8a)$$

Even more preferably, the condition expression (8a) is set as follows:

$$1.75 < N_{d\_N1} < 2.20 \quad (8b)$$

The condition expression (9) relates to the Abbe number of the material of the positive lens P2 in the rear attachment lens LA. If the upper limit value of the condition expression (9) is exceeded, the axial chromatic aberration would be enlarged. If the lower limit value of the condition expression (9) is exceeded, this would be advantageous in correcting the axial chromatic aberration, but it would be difficult to keep balance in correction between the chromatic aberration of magnification and the axial chromatic aberration. The condition expression (9) is more preferably set as follows:

$$10 < v_{d\_P2} < 35 \quad (9a)$$

The condition expression (10) relates to the refractive index of the material of the positive lens P2 in the rear attachment lens LA. If the upper limit value of the condition expression (10) is exceeded, it would be difficult to keep balance in correction between the chromatic aberration and the curving of the image plane. If the lower limit value of the condition expression (10) is exceeded, a greater power would be required to correct the axial chromatic aberration because the refractive index is low. Accordingly, the radius of curvature of the lens surface would be reduced, thus making it difficult to keep balance in correction between the axial chromatic aberration and the other aberrations including the spherical aberration. The condition expression (10) is more preferably set as follows:

$$1.55 < N_{d\_P2} < 1.71 \quad (10a)$$

Even more preferably, the condition expression (10a) is set as follows:

$$1.55 < N_{d\_P2} < 1.70 \quad (10b)$$

The condition expression (11) relates to the position where the positive lens P2 is arranged in the rear attachment lens LA. If the upper limit value of the condition expression (11) is exceeded, this implies that the positive lens P2 is arranged at a position in the rear attachment lens where the height of incidence of the axial ray is low and the height of incidence of the off-axis principal ray is high. When trying to satisfactorily correct the axial chromatic aberration in such an arrangement, the chromatic aberration of magnification would be enlarged. Accordingly, a difficulty arises in keeping balance in correction between both the chromatic aberrations. Because the lower limit value of the condition expression (11) represents the positive lens P2 that is positioned at the object side end in the rear attachment lens, it is not exceeded in practice. The condition expression (11) is more preferably set as follows:

$$0.05 \leq d_{P2}/d_0 < 0.40 \quad (11a)$$

The condition expression (12) relates to the chromatic-aberration corrective power of the positive lens P2 in the rear attachment lens LA. If the upper limit value of the condition expression (12) is exceeded, the chromatic-aberration corrective power of the positive lens P2 would be too weak and the correction of the axial chromatic aberration would be insufficient. If the lower limit value of the condition expression (12) is exceeded, the chromatic-aberration corrective power would be too strong and the axial chromatic aberration would be corrected overly. Hence, it would be difficult to keep balance in correction between the axial chromatic aberration and the other chromatic aberrations including the chromatic aberration of magnification. The condition expression (12) is more preferably set as follows:

$$-0.003 < \Delta\theta gF_{\_P2} \times f/(f_{\_P2} \times v_{d\_P2}) < -0.0004 \quad (12a)$$

By specifying various factors as described above, each embodiment can correct the chromatic aberrations over an entire image field and can provide the imaging optical system having high optical performance.

Numerical values of the main lens system and numerical-value EXAMPLES 1 to 4 corresponding to the first to fourth embodiments of the present invention will be described below. In each of the numerical-value EXAMPLES, "i" denotes the order of a plane counting from the object side, "$r_i$" denotes the radius of curvature of the i-th plane counting from the object side, "$d_i$" denotes the spacing between the i-th plane and the (i+1)-th plane counting from the object side, and "$nd_i$" and "$vd_i$" denote respectively the refractive index and the Abbe number of the i-th optical member. θgF and ΔθgF denote respectively the partial dispersion ratio and the partial dispersion ratio difference of the optical member. P1 and P2 each represent the positive lens, and N1 represents the negative lens.

In each of the foregoing examples, the refractive index of the optical member at the g-line is $N_g$, the refractive index thereof at the F-line is $N_F$, and the refractive index thereof at the C-line is $N_C$, the partial dispersion ratio is expressed by:

$$\theta gF = (N_g - N_F)/(N_F - N_c)$$

Further, the partial dispersion ratio difference is expressed by:

$$\Delta\theta gF = \theta gF - (-1.61783 \times 10^{-3} \times v_d + 0.64146)$$

Moreover, f, Fno, and 2ω denote respectively the focal length, the F-number, and the angle of view (degrees) of the entire system when focusing is made on an object at infinity. The relationships between the above-mentioned condition expressions and various numerical values in each of the numerical-value EXAMPLES are listed in Table 1. In Table 1, the conditional expression (1) represents the partial dispersion ratio θgF. In each of the numerical-value EXAMPLES 1 to 4, an axial air distance from the final surface (outermost surface on the image side) of the main lens system LM to the first R1 surface (outermost surface on the object side) of the rear attachment lens LA is 20.56 mm.

(Main Lens System)

f=299.99 mm Fno=2.99 2ω=8.26

| Plane No. (i) | ri | di | ndi | vdi | Effective Diameter | θgF | ΔθgF |
|---|---|---|---|---|---|---|---|
| 1 | 149.921 | 17.00 | 1.49700 | 81.5 | 103.45 | 0.5386 | 0.02916 |
| 2 | −287.346 | 0.15 | | | 102.70 | | |
| 3 | 107.686 | 12.00 | 1.43387 | 95.1 | 93.56 | 0.5373 | 0.04975 |
| 4 | 948.608 | 4.36 | | | 92.17 | | |
| 5 | −337.599 | 4.50 | 1.77250 | 49.6 | 92.08 | 0.5523 | −0.00885 |
| 6 | 151.227 | 14.92 | | | 86.70 | | |
| 7 | 82.152 | 15.00 | 1.49700 | 81.5 | 82.44 | 0.5386 | 0.02916 |
| 8 | 9334.428 | 0.15 | | | 80.48 | | |
| 9 | 52.124 | 5.00 | 1.58144 | 40.8 | 69.95 | 0.5774 | 0.00189 |
| 10 | 43.474 | 34.00 | | | 63.53 | | |
| 11 | 214.749 | 3.99 | 1.84666 | 23.8 | 49.49 | 0.6203 | 0.01734 |
| 12 | −590.486 | 0.58 | | | 48.60 | | |
| 13 | −509.687 | 2.20 | 1.88300 | 40.8 | 48.12 | 0.5669 | −0.00856 |

-continued

| Plane No. (i) | ri | di | ndi | νdi | Effective Diameter | θgF | ΔθgF |
|---|---|---|---|---|---|---|---|
| 14 | 70.924 | 22.54 | | | 45.28 | | |
| 15 (aperture) | ∞ | 7.64 | | | 40.64 | | |
| 16 | 139.913 | 1.80 | 1.84666 | 23.8 | 38.44 | 0.6203 | 0.01734 |
| 17 | 40.306 | 8.70 | | | 37.14 | | |
| 18 | −250.105 | 1.00 | | | 36.28 | | |
| 19 | 63.188 | 5.00 | 1.84666 | 23.8 | 33.98 | 0.6203 | 0.01734 |
| 20 | −180.442 | 1.70 | 1.75500 | 52.3 | 32.90 | 0.5482 | −0.00865 |
| 21 | 35.743 | 5.52 | | | 29.88 | | |
| 22 | −93.126 | 1.65 | | | 30.02 | | |
| 23 | 83.876 | 2.50 | | | 30.99 | | |
| 24 | 106.897 | 4.70 | 1.72916 | 54.7 | 32.76 | 0.5442 | −0.00880 |
| 25 | 211.862 | 2.64 | | | 33.64 | | |
| 26 | 54.058 | 6.00 | 1.48749 | 70.2 | 36.38 | 0.5303 | 0.00244 |
| 27 | 259.048 | 10.00 | | | 36.46 | | |
| 28 | ∞ | 2.00 | 1.51633 | 64.1 | 37.29 | 0.5342 | −0.00353 |
| 29 | ∞ | | | | 37.29 | | |

$\Delta\theta gF = \theta gF - (-1.61783\times10^{-3}\times\nu d + 0.64146)$ (Numerical-Value Example 1)

f=−124.47 mm Magnification=1.95

| Plane No. (i) | ri | di | ndi | νdi | Effective Diameter | θgF | ΔθgF |
|---|---|---|---|---|---|---|---|
| 1 | 45.838 | 1.60 | 1.88300 | 40.8 | 28.00 | 0.5669 | −0.00856 |
| 2 | 23.277 | 1.80 | | | 26.50 | | |
| 3 | 35.275 | 7.21 | 1.60342 | 38.0 | 27.50 | 0.5835 | 0.00355 |
| 4 | −47.454 | 2.61 | | | 27.00 | | |
| 5 | −56.981 | 1.20 | 1.77250 | 49.6 | 23.00 | 0.5523 | −0.00885 |
| 6 | 44.889 | 8.20 | 1.69895 | 30.1 | 24.50 | 0.6030 | 0.01030 |
| P2 | | | | | | | |
| 7 | 19.036 | 1.20 | 1.88300 | 40.8 | 24.50 | 0.5669 | −0.00856 |
| 8 | 58.668 | 4.77 | | | 27.50 | | |
| 9 | 57.612 | 5.00 | 1.61340 | 44.3 | 31.00 | 0.5628 | −0.00709 |
| 10 | −120.184 | 2.00 | 1.84666 | 23.8 | 31.00 | 0.6203 | 0.01734 |
| N1 | | | | | | | |
| 11 | 111.953 | 5.21 | | | 31.00 | | |
| 12 | −155.434 | 6.09 | 1.61340 | 44.3 | 30.50 | 0.5628 | −0.00709 |
| P1 | | | | | | | |
| 13 | −25.349 | 0.20 | | | 32.00 | | |
| 14 | −87.970 | 1.55 | 1.84666 | 23.8 | 34.50 | 0.6203 | 0.01734 |
| 15 | −457.285 | | | | 36.00 | | |

$\Delta\theta gF = \theta gF - (-1.61783\times10^{-3}\Delta\nu d + 0.64146)$ (Numerical-Value Example 2)

f=−122.07 mm Magnification=1.94

| Plane No. (i) | ri | di | ndi | νdi | Effective Diameter | θgF | ΔθgF |
|---|---|---|---|---|---|---|---|
| 1 | 45.930 | 1.60 | 1.88300 | 40.8 | 28.00 | 0.5669 | −0.00856 |
| 2 | 23.101 | 1.89 | | | 26.50 | | |
| 3 | 35.791 | 7.75 | 1.60342 | 38.0 | 27.50 | 0.5835 | 0.00355 |
| 4 | −46.003 | 2.30 | | | 27.00 | | |
| 5 | −57.853 | 1.20 | 1.77250 | 49.6 | 23.00 | 0.5523 | −0.00885 |
| 6 | 44.676 | 8.20 | 1.69895 | 30.1 | 24.50 | 0.6030 | 0.01030 |
| P2 | | | | | | | |
| 7 | −18.887 | 1.20 | 1.88300 | 40.8 | 24.50 | 0.5669 | −0.00856 |
| 8 | 64.810 | 6.05 | | | 27.50 | | |
| 9 | 59.425 | 5.00 | 1.65412 | 39.7 | 31.00 | 0.5740 | −0.00322 |
| 10 | −86.355 | 2.00 | 1.84666 | 23.8 | 31.00 | 0.6203 | 0.01734 |
| N1 | | | | | | | |
| 11 | 95.171 | 3.62 | | | 31.00 | | |
| 12 | −205.306 | 6.09 | 1.65412 | 39.7 | 30.50 | 0.5740 | −0.00322 |
| P1 | | | | | | | |
| 13 | −25.723 | 0.20 | | | 32.00 | | |
| 14 | −77.301 | 1.55 | 1.84666 | 23.8 | 34.50 | 0.6203 | 0.01734 |
| 15 | −553.877 | | | | 36.00 | | |

$\Delta\theta gF = \theta gF - (-1.61783\times10^{-3}\Delta\nu d + 0.64146)$ (Numerical-Value Example 3)

f=−122.50 mm Magnification=1.93

| Plane No. (i) | ri | di | ndi | νdi | Effective Diameter | θgF | ΔθgF |
|---|---|---|---|---|---|---|---|
| 1 | 49.830 | 1.60 | 1.88300 | 40.8 | 28.00 | 0.5669 | −0.00856 |
| 2 | 23.185 | 1.85 | | | 26.50 | | |
| 3 | 35.557 | 7.05 | 1.65412 | 39.7 | 27.50 | 0.5740 | −0.00322 |
| P1 | | | | | | | |
| 4 | −46.498 | 1.92 | | | 27.00 | | |
| 5 | −59.005 | 1.20 | 1.77250 | 49.6 | 23.00 | 0.5523 | −0.00885 |
| 6 | 43.373 | 8.20 | 1.69895 | 30.1 | 24.50 | 0.6030 | 0.01030 |
| P2 | | | | | | | |
| 7 | −19.332 | 1.20 | 1.88300 | 40.8 | 24.50 | 0.5669 | −0.00856 |
| 8 | 67.563 | 8.01 | | | 27.50 | | |
| 9 | 71.755 | 5.00 | 1.62588 | 35.7 | 31.00 | 0.5889 | 0.00521 |
| 10 | −67.360 | 2.00 | 1.84666 | 23.8 | 31.00 | 0.6203 | 0.01734 |
| N1 | | | | | | | |
| 11 | 132.602 | 2.14 | | | 31.00 | | |
| 12 | −164.863 | 6.09 | 1.65412 | 39.7 | 30.50 | 0.5740 | −0.00322 |
| 13 | −25.521 | 0.20 | | | 32.00 | | |
| 14 | −71.715 | 1.55 | 1.84666 | 23.8 | 34.50 | 0.6203 | 0.01734 |
| 15 | −403.337 | | | | 36.00 | | |

$\Delta\theta gF = \theta gF - (-1.61783\times10^{-3}\Delta\nu d + 0.64146)$ (Numerical-Value Example 4)

f=−104.29 mm Magnification=1.99

| Plane No. (i) | ri | di | ndi | νdi | Effective Diameter | θgF | ΔθgF |
|---|---|---|---|---|---|---|---|
| 1 | 55.412 | 1.60 | 1.88300 | 40.8 | 28.00 | 0.5669 | −0.00856 |
| 2 | 23.948 | 3.49 | | | 26.50 | | |
| 3 | 34.863 | 6.24 | 1.68893 | 31.1 | 27.50 | 0.5999 | 0.00872 |
| P2 | | | | | | | |
| 4 | −54.897 | 2.31 | | | 27.00 | | |
| 5 | −77.503 | 1.20 | 1.77250 | 49.6 | 23.00 | 0.5523 | −0.00885 |
| 6 | 41.658 | 8.20 | 1.63980 | 34.5 | 24.50 | 0.5921 | 0.00644 |
| P2 | | | | | | | |
| 7 | −21.360 | 1.20 | 1.88300 | 40.8 | 24.50 | 0.5669 | −0.00856 |
| 8 | 96.030 | 2.41 | | | 27.50 | | |

-continued

| Plane No. (i) | ri | di | ndi | vdi | Effective Diameter | θgF | ΔθgF |
|---|---|---|---|---|---|---|---|
| 9 | 68.813 | 5.00 | 1.57501 | 41.5 | 31.00 | 0.5765 | 0.00214 |
| 10 N1 | −144.939 | 2.00 | 2.14352 | 17.8 | 31.00 | 0.6586 | 0.04588 |
| 11 | 104.012 | 6.02 | | | 31.00 | | |
| 12 P1 | −582.119 | 6.09 | 1.74950 | 35.3 | 30.50 | 0.5818 | −0.00249 |
| 13 | −27.173 | 0.20 | | | 32.00 | | |
| 14 | −59.428 | 1.55 | 1.83400 | 37.2 | 34.50 | 0.5775 | −0.00379 |
| 15 | −738.311 | | | | 36.00 | | |

$\Delta\theta gF = \theta gF - (-1.61783 \times 10^{-3} \Delta vd + 0.64146)$

TABLE 1

| | First Embodiment | Second Embodiment | Third Embodiment | Fourth Embodiment |
|---|---|---|---|---|
| Condition Expression (1) | 0.56277 | 0.57403 | 0.57403 | 0.58180 |
| Condition Expression (2) | 44.3 | 39.7 | 39.7 | 35.3 |
| Condition Expression (3) | $4.1 \times 10^{-4}$ | $2.2 \times 10^{-4}$ | $3.1 \times 10^{-4}$ | $1.9 \times 10^{-4}$ |
| Condition Expression (4) | 1.61340 | 1.65412 | 1.65412 | 1.74950 |
| Condition Expression (5) | 0.309 | 0.133 | 0.183 | 0.038 |
| Condition Expression (6) | 0.69 | 0.72 | 0.75 | 0.67 |
| Condition Expression (7) | 23.8 | 23.8 | 23.8 | 17.8 |
| Condition Expression (8) | 1.84666 | 1.84666 | 1.84666 | 2.14352 |
| Condition Expression (9) | 30.1 | 30.1 | 30.1 | 31.1 34.5 |
| Condition Expression (10) | 1.69895 | 1.69895 | 1.69895 | 1.68893 1.63980 |
| Condition Expression (11) | 0.30 | 0.30 | 0.28 | 0.11 0.31 |
| Condition Expression (12) | −0.00211 | −0.00208 | −0.00207 | −0.00092 −0.00084 |

In a column for the fourth embodiment in Table 1, values in upper and lower stages in each of rows corresponding to the condition expressions (9), (10), (11) and (12) represent respective values of the first and second positive lenses, which constitute the positive lens P2, counting from the object side toward the image side.

An example of a single-lens reflex camera (image pickup apparatus) including the rear attachment lens according to the present invention, which is mounted to the image side of the main lens system and is used as the imaging optical system, will be described below with reference to FIG. 12.

In FIG. 12, reference numeral 30 denotes an imaging lens including an imaging optical system 21 according to one of the first to fourth embodiments. The imaging optical system 21 is held in a lens barrel 22 that serves as a holding member. A main body 40 of the camera includes a quick return mirror 23 for reflecting light flux coming through the imaging lens 30 upward, and a focusing plate 24 arranged at a position where an image is formed by the imaging lens 30. Further, the camera main body 40 includes a pentagonal Dach prism 25 for converting an inverted image, which is formed by the focusing plate 24, to an erected image, an eyepiece lens 26 for forming the erected image at a magnification scale, etc. Reference numeral 27 denotes a photosensitive surface where a solid-state image pickup element (photoelectric conversion element) of a CCD sensor, a CMOS sensor, etc., which serves as a light receiving unit (recording unit), or a silver-halide film is arranged. When picking up an image, the quick return mirror 23 is retracted from an optical path, and the image is formed on the photosensitive surface 27 by the imaging lens 30.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-281427 filed Dec. 11, 2009, which is hereby incorporated by reference herein in its entirety.

What is claimed is:

1. A rear attachment lens detachably attached to the image side of a main lens system to change a focal length of an entire system so as to become longer than a focal length of the main lens system, the rear attachment lens comprising:
   one or more positive lenses GMp,
   wherein, an Abbe number and a partial dispersion ratio difference of a material of the positive lens GMp are respectively $v_{d\_P}$ and $\Delta\theta gF_{\_P}$, a focal length of the positive lens GMp is $f_{\_P}$, a focal length of the rear attachment lens is f, and $(\Delta\theta gF_{\_P} \times f)/(f_{\_P} \times v_{d\_P})$ is a ratio P,
   wherein, one among the one or more positive lenses GMp having a maximum ratio P is a positive lens P1, the Abbe number, a partial dispersion ratio, and a partial dispersion ratio difference of a material of the positive lens P1 are respectively $v_{d\_P1}$, $\theta gF_{\_P1}$ and $\Delta\theta gF_{\_P1}$, a focal length of the positive lens P1 is $f_{\_P1}$, and $(\Delta\theta gF_{\_P1} \times f)/(f_{\_P1} \times v_{d\_P1})$ is a ratio $P_{\_P1}$, such that the following conditions are satisfied:

$-1.665 \times 10^{-7} \times v_{d\_P1}^3 + 5.213 \times 10^{-5} \times v_{d\_P1}^2 - 5.656 \times 10^{-3} \times v_{d\_P1} + 0.7006 < \theta gF_{\_P1} < -1.61783 \times 10^{-3} \times v_{d\_P1} + 0.64046$ $20 < v_{d\_P1} < 50$ $1 \times 10^{-4} < P_{\_P1} < 1 \times 10^{-3}$.

2. The rear attachment lens according to claim 1, wherein a refractive index of the material of the positive lens P1 is $N_{d\_P1}$, and a following condition is satisfied:

$1.45 < N_{d\_P1} < 1.76$.

3. The rear attachment lens according to claim 1, wherein the rear attachment lens further includes one or more negative lenses GMn, an Abbe number and a partial dispersion ratio difference of a material of the negative lens GMn are respectively $v_{d\_N}$ and $\Delta\theta gF_{\_N}$, a focal length of the negative lens is $f_{\_N}$, and $(\Delta\theta gF_{\_N} \times f)/(f_{\_N} \times v_{d\_N})$ is a ratio N, and
wherein one among the one or more negative lenses GMn having a maximum ratio N is a negative lens N1, an Abbe number and a partial dispersion ratio difference of a material of the negative lens N1 are respectively $v_{d\_N1}$ and $\Delta\theta gF_{\_N1}$, and a focal length of the negative lens N1 is $f_{\_N1}$, such that the following condition is satisfied:

$0 < (\Delta\theta gF_{\_P1}/(f_{\_P1} \times v_{d\_P1}))/(\Delta\theta gF_{\_N1}/(f_{\_N1} \times v_{d\_N1})) < 10$.

4. The rear attachment lens according to claim 3, wherein, $d_0$ is a distance from the surface vertex on the object side of one among the lenses in the rear attachment lens, which is positioned nearest to the object side end, to the surface vertex on the image side of one among the lenses in the rear attachment lens, which is positioned nearest to the image side end, and $d_{N1}$ is a distance from a surface vertex on the object side of the one among the lenses in the rear attachment lens, which is positioned nearest to the object side end, to the surface vertex on the object side of the negative lens N1, such that a following condition is satisfied:

$0.5 < d_{N1}/d_0 < 1.0$.

5. The rear attachment lens according to claim 3, wherein, when a refractive index of the material of the negative lens N1 at the d-line is $N_{d\_N1}$, the following conditions are satisfied:

$10 < \nu_{d\_N1} < 30$ $1.65 < N_{d\_N1} < 2.30$.

6. The rear attachment lens according to claim 1,
wherein the rear attachment lens includes at least one positive lens P2 in addition to the positive lens P1, and
wherein, when an Abbe number and a refractive index of a material of the positive lens P2 are respectively $\nu_{d\_P2}$ and $N_{d\_P2}$, a distance from the surface vertex on the object side of one among the lenses in the rear attachment lens, which is positioned nearest to the object side end, to the surface vertex on the image side of one among those lenses, which is positioned nearest to the image side end, is $d_0$, and a distance from the surface vertex on the object side of one among the lenses in the rear attachment lens, which is positioned nearest to the object side end, to the surface vertex on the object side of the positive lens P2 is $d_{p2}$, the following conditions are satisfied:

$10 < \nu_{d\_P2} < 40$ $1.45 < N_{d\_P2} < 1.75$ $0 \leq d_{P2}/d_0 < 0.5$.

7. The rear attachment lens according to claim 6,
wherein, when a partial dispersion ratio difference of a material of the positive lens P2 is $\Delta\theta F_{\_P2}$ and a focal length of the positive lens P2 is $f_{\_P2}$, a following condition is satisfied:

$-0.004 < \Delta\theta gF_{\_P2} \times f/(f_{\_P2} \times \nu_{d\_P2}) < -0.0005$.

8. An imaging optical system, comprising:
a main lens system; and
the rear attachment lens according to claim 1, the rear attachment lens being detachably attached to the main lens system at the image side of the main lens system.

9. An image pickup apparatus, comprising:
the imaging optical system according to claim 8; and
a solid-state image pickup element that receives an image formed by the imaging optical system.

* * * * *